United States Patent
Laddu

(10) Patent No.: US 12,245,181 B2
(45) Date of Patent: Mar. 4, 2025

(54) MULTI-TRANSMIT-RECEIVE POINT TRANSMISSION FOR ULTRA RELIABLE LOW LATENCY COMMUNICATION

(71) Applicant: Nokia Technologies Oy, Espoo (FI)

(72) Inventor: Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 468 days.

(21) Appl. No.: 17/618,721

(22) PCT Filed: Jul. 12, 2019

(86) PCT No.: PCT/EP2019/068862
§ 371 (c)(1),
(2) Date: Dec. 13, 2021

(87) PCT Pub. No.: WO2021/008673
PCT Pub. Date: Jan. 21, 2021

(65) Prior Publication Data
US 2022/0248358 A1   Aug. 4, 2022

(51) Int. Cl.
*H04W 56/00*   (2009.01)
*H04W 88/14*   (2009.01)

(52) U.S. Cl.
CPC ..... *H04W 56/0045* (2013.01); *H04W 56/001* (2013.01); *H04W 88/14* (2013.01)

(58) Field of Classification Search
CPC   H04W 56/0045; H04W 56/001; H04W 88/14
See application file for complete search history.

(56) References Cited

U.S. PATENT DOCUMENTS

| | | | | |
|---|---|---|---|---|
| 2015/0117417 A1* | 4/2015 | Muharemovic | ........ | H04B 7/024 370/336 |
| 2018/0199367 A1* | 7/2018 | Jung | ..................... | H04W 72/23 |
| 2019/0116605 A1* | 4/2019 | Luo | .................. | H04W 72/0446 |

FOREIGN PATENT DOCUMENTS

| EP | 2112775 B1 * | 6/2018 | ............. H01Q 1/246 |
|---|---|---|---|
| WO | 2020/194103 A1 | 10/2020 | |

OTHER PUBLICATIONS

"Revised WID: Enhancements on MIMO for NR", 3GPP TSG RAN Meeting #81, RP-182067, Agenda: 9.4.1, Samsung, Sep. 10-13, 2018, 5 pages.

"3rd Generation Partnership Project; Technical Specification Group Radio Access Network; NR; Requirements for support of radio resource management (Release 15)", 3GPP TS 38.133, V15.5.0, Mar. 2019, pp. 1-893.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

(Continued)

*Primary Examiner* — Duc C Ho
(74) *Attorney, Agent, or Firm* — Nokia Technologies Oy

(57) ABSTRACT

There is provided an apparatus, said apparatus comprising means for determining a propagation delay between each of a plurality of transmit-receive points of a network and a user device, determining, based on each determined propagation delay, at least one parameter associated with transmissions from each of the transmit-receive points and providing an indication to the user device of the determined at least one parameter.

14 Claims, 10 Drawing Sheets

(56) References Cited

OTHER PUBLICATIONS

"3rd Generation Partnership Project; Technical Specification Group Radio Access Network; NR; Physical layer procedures for data (Release 15)", 3GPP TS 38.214, V15.5.0, Mar. 2019, pp. 1-103.

International Search Report and Written Opinion received for corresponding Patent Cooperation Treaty Application No. PCT/EP2019/068862, dated Mar. 11, 2020, 14 pages.

"Enhancements on Multi-TRP/Panel Transmission", 3GPP TSG RAN WG1 #96bis Meeting, R1-1905064, Agenda: 7.2.8.2, Nokia, Apr. 8-12, 2019, 18 pages.

"Considerations on timing advance design in NR", 3GPP TSG RAN WG1 Meeting #91, R1-1719810, Agenda: 7.2.2.6, Huawei, Nov. 27-Dec. 1, 2017, 4 pages.

"Discussion on uplink multi-panel and multi-TRP operation", 3GPP TSG RAN WG1 Meeting #90, R1-1712541, Agenda: 6.1.2.1.6, Intel Corporation, Aug. 21-25, 2017, pp. 1-3.

\* cited by examiner

M-TRP based URLLC scheduling logic

MULTI-TRANSMIT-RECEIVE POINT TRANSMISSION FOR ULTRA RELIABLE LOW LATENCY COMMUNICATION

RELATED APPLICATION

This application was originally filed as PCT Application No. PCT/EP2019/068862 on Jul. 12, 2019, which is hereby incorporated in its entirety.

FIELD

The present application relates to a method, apparatus, system and computer program and in particular but not exclusively to time division multiplexed (TDM) repetition pattern for multi transmit-receive points (TRP)/panel/beam ultra reliable low latency communication (URLLC).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus, said apparatus comprising means for determining a propagation delay between each of a plurality of transmit-receive points of a network and a user device, determining, based on each determined propagation delay, at least one parameter associated with transmissions from each of the transmit-receive points and providing an indication to the user device of the determined at least one parameter.

The at least one parameter may be a transmission order for transmissions from the plurality of transmit-receive points repetition or a timing gap between transmissions from the plurality of transmit-receive points.

The propagation delay may be determined based on timing advance information.

The apparatus may comprise means for, when at least one of the plurality of transmit-receive points are asynchronous, determining downlink timing related information for the at least one of the plurality of transmit-receive points and determining transmission order for transmissions or a timing gap between transmissions based on the propagation delay and the downlink timing related information.

The downlink timing related information may be a downlink timing offset relative to a common timing reference at each of the plurality of transmit-receive points.

The downlink timing information may be determined based an indication from the user device.

The indication from the user device may comprise one of an indication of a difference between downlink timing reception from two of the plurality of transmit-receive points and the uplink timing of a reference transmission from the user device at one of the plurality of transmit-receive points.

Means for determining downlink timing related information for at least one of the plurality of transmit-receive points may comprise means for receiving an indication at a central unit or a primary transmit-receive point from the at least one of the transmit-receive points of the downlink timing related information.

The apparatus may comprise means for receiving an indication that transmissions from at least two of the plurality of transmit-receive points are overlapping when received at the user device and in response, determining the parameters associated with the transmissions from the transmit-receive points.

The transmit-receive points may comprise an integrated access and backhaul node.

Means for determining a propagation delay between each of the plurality of transmit-receive points of a network and the user device may comprise means for receiving an indication at a central unit or a primary transmit-receive point from at least one of the transmit-receive points of the propagation delay between the user device and the at least one transmit-receive point.

The transmissions from the plurality of transmit-receive points may comprise the same transport block in different time domain resources within a slot duration.

In a second aspect there is provided a method comprising determining a propagation delay between each of a plurality of transmit-receive points of a network and a user device, determining, based on each determined propagation delay, at least one parameter associated with transmissions from each of the transmit-receive points and providing an indication to the user device of the determined at least one parameter.

The at least one parameter may be a transmission order for transmissions from the plurality of transmit-receive points repetition or a timing gap between transmissions from the plurality of transmit-receive points.

The propagation delay may be determined based on timing advance information.

The method may comprise, when at least one of the plurality of transmit-receive points are asynchronous, determining downlink timing related information for the at least one of the plurality of transmit-receive points and determining transmission order for transmissions or a timing gap between transmissions based on the propagation delay and the downlink timing related information.

The downlink timing related information may be a downlink timing offset relative to a common timing reference at each of the plurality of transmit-receive points.

The downlink timing information may be determined based an indication from the user device.

The indication from the user device may comprise one of an indication of a difference between downlink timing reception from two of the plurality of transmit-receive points and the uplink timing of a reference transmission from the user device at one of the plurality of transmit-receive points.

Determining downlink timing related information for at least one of the plurality of transmit-receive points may comprise receiving an indication at a central unit or a primary transmit-receive point from the at least one of the transmit-receive points of the downlink timing related information.

The method may comprise receiving an indication that transmissions from at least two of the plurality of transmit-receive points are overlapping when received at the user device and in response, determining the parameters associated with the transmissions from the transmit-receive points.

The transmit-receive points may comprise an integrated access and backhaul node.

Determining a propagation delay between each of the plurality of transmit-receive points of a network and the user device may comprise receiving an indication at a central unit or a primary transmit-receive point from at least one of the transmit-receive points of the propagation delay between the user device and the at least one transmit-receive point.

The transmissions from the plurality of transmit-receive points may comprise the same transport block in different time domain resources within a slot duration.

In a third aspect there is provided an apparatus comprising: at least one processor and at least one memory including a computer program code, the at least one memory and computer program code configured to, with the at least one processor, cause the apparatus at least to: determine a propagation delay between each of a plurality of transmit-receive points of a network and a user device, determine, based on each determined propagation delay, at least one parameter associated with transmissions from each of the transmit-receive points and provide an indication to the user device of the determined at least one parameter.

The at least one parameter may be a transmission order for transmissions from the plurality of transmit-receive points repetition or a timing gap between transmissions from the plurality of transmit-receive points.

The propagation delay may be determined based on timing advance information.

The apparatus may be configured to, when at least one of the plurality of transmit-receive points are asynchronous, determine downlink timing related information for the at least one of the plurality of transmit-receive points and determine transmission order for transmissions or a timing gap between transmissions based on the propagation delay and the downlink timing related information.

The downlink timing related information may be a downlink timing offset relative to a common timing reference at each of the plurality of transmit-receive points.

The downlink timing information may be determined based an indication from the user device.

The indication from the user device may comprise one of an indication of a difference between downlink timing reception from two of the plurality of transmit-receive points and the uplink timing of a reference transmission from the user device at one of the plurality of transmit-receive points.

The apparatus may be configured to receive an indication at a central unit or a primary transmit-receive point from the at least one of the transmit-receive points of the downlink timing related information.

The apparatus may be configured to receive an indication that transmissions from at least two of the plurality of transmit-receive points are overlapping when received at the user device and in response, determine the parameters associated with the transmissions from the transmit-receive points.

The transmit-receive points may comprise an integrated access and backhaul node.

The apparatus may be configured to receive an indication at a central unit or a primary transmit-receive point from at least one of the transmit-receive points of the propagation delay between the user device and the at least one transmit-receive point.

The transmissions from the plurality of transmit-receive points may comprise the same transport block in different time domain resources within a slot duration.

In a fourth aspect there is provided a computer readable medium comprising program instructions for causing an apparatus to perform at least the following determining a propagation delay between each of a plurality of transmit-receive points of a network and a user device, determining, based on each determined propagation delay, at least one parameter associated with transmissions from each of the transmit-receive points and providing an indication to the user device of the determined at least one parameter.

The at least one parameter may be a transmission order for transmissions from the plurality of transmit-receive points repetition or a timing gap between transmissions from the plurality of transmit-receive points.

The propagation delay may be determined based on timing advance information.

The apparatus may be caused to perform, when at least one of the plurality of transmit-receive points are asynchronous, determining downlink timing related information for the at least one of the plurality of transmit-receive points and determining transmission order for transmissions or a timing gap between transmissions based on the propagation delay and the downlink timing related information.

The downlink timing related information may be a downlink timing offset relative to a common timing reference at each of the plurality of transmit-receive points.

The downlink timing information may be determined based an indication from the user device.

The indication from the user device may comprise one of an indication of a difference between downlink timing reception from two of the plurality of transmit-receive points and the uplink timing of a reference transmission from the user device at one of the plurality of transmit-receive points.

Determining downlink timing related information for at least one of the plurality of transmit-receive points may comprise receiving an indication at a central unit or a primary transmit-receive point from the at least one of the transmit-receive points of the downlink timing related information.

The apparatus may be caused to perform receiving an indication that transmissions from at least two of the plurality of transmit-receive points are overlapping when received at the user device and in response, determining the parameters associated with the transmissions from the transmit-receive points.

The transmit-receive points may comprise an integrated access and backhaul node.

Determining a propagation delay between each of the plurality of transmit-receive points of a network and the user device may comprise receiving an indication at a central unit or a primary transmit-receive point from at least one of the transmit-receive points of the propagation delay between the user device and the at least one transmit-receive point.

The transmissions from the plurality of transmit-receive points may comprise the same transport block in different time domain resources within a slot duration.

In a fifth aspect there is provided a non-transitory computer readable medium comprising program instructions for causing an apparatus to perform at least the method according to the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
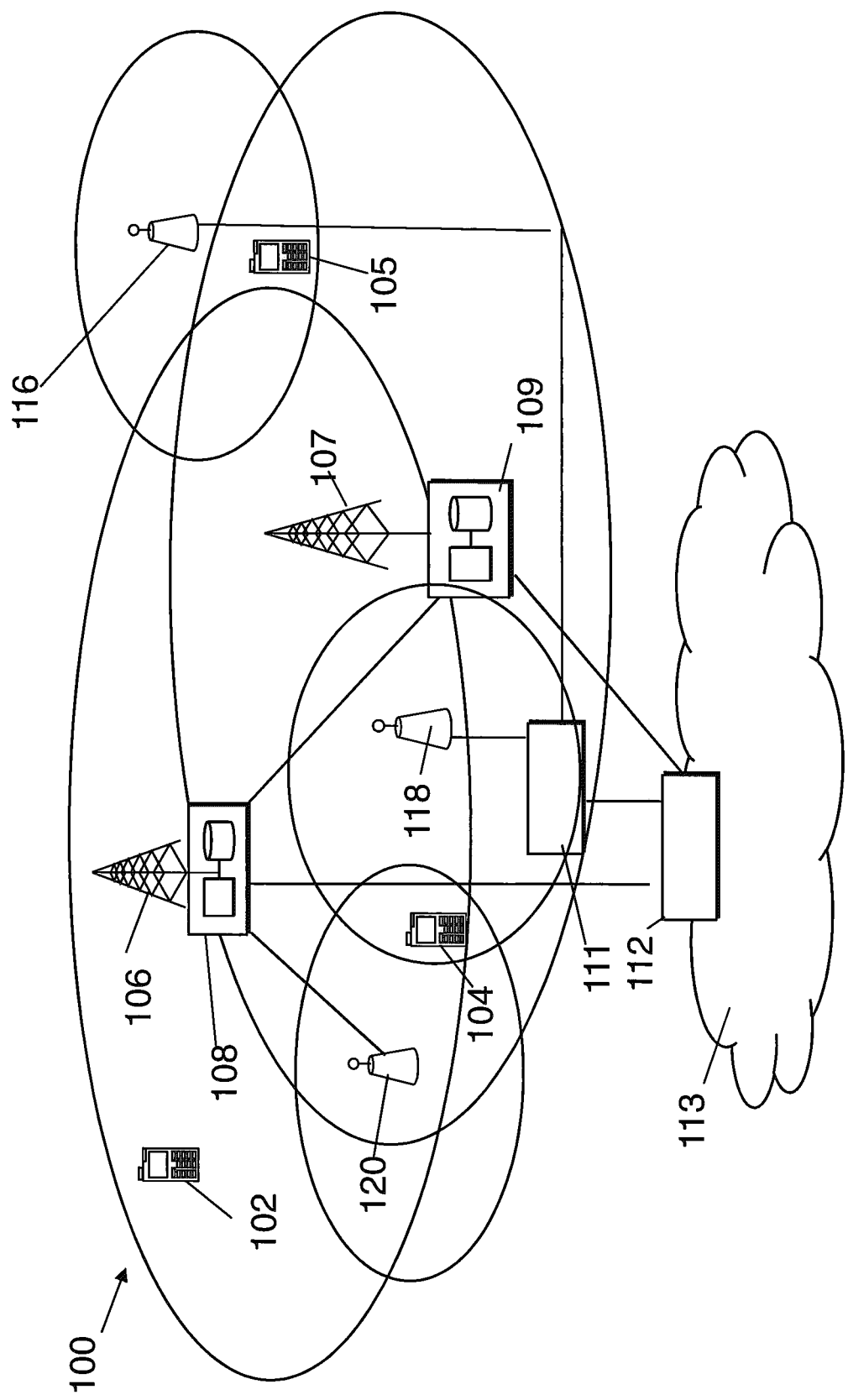
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
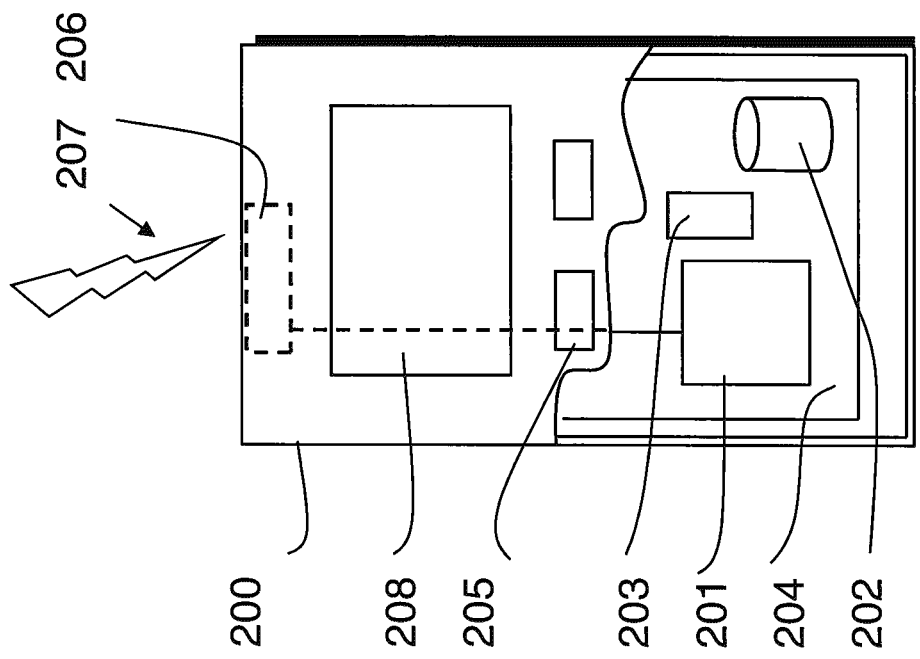
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
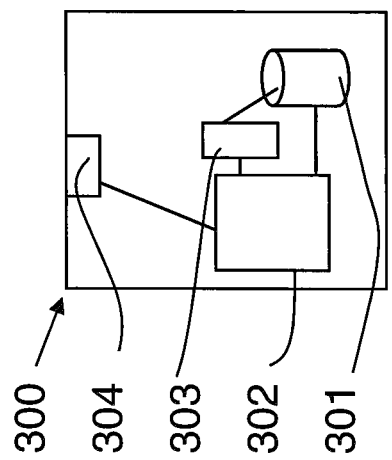
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

In NR MIMO enhancements for Rel-16, multi-transmit-receive points (TRP) are considered as an essential component due to the benefits of enhanced mobile broadband eMBB operations and the improved reliability for ultra reliable low latency (URLLC) services. A work item description of MIMO enhancements [RP-182067, "Revised WID: Enhancements on MIMO for NR", Samsung] states the following:

Enhancements on multi-TRP/panel transmission including improved reliability and robustness with both ideal and non-ideal backhaul:
Specify downlink control signalling enhancement(s) for efficient support of non-coherent joint transmission
Perform study and, if needed, specify enhancements on uplink control signalling and/or reference signal(s) for non-coherent joint transmission
Multi-TRP techniques for URLLC requirements are included in this WI To improve reliability and robustness, diversity-based transmission schemes are considered in RAN1. Compared to single TRP Physical Downlink Shared Channel (PDSCH) repetition, it is possible to use the basic principle of diversity to send the same information from multiple TRPs. Since channels are different from each TRP, multi-TRP repetition may provide higher spatial diversity, thus achieving improved reliability.

PDSCH related URLLC enhancements have been discussed and several schemes have been agreed to consider further.

The following details for URLLC schemes have been concluded:

To facilitate further down-selection for one or more schemes in RAN1 #96bis, schemes for multi-TRP based URLLC, scheduled by single DCI at least, are clarified as following:

Scheme 1 uses Space Division Multiplexing (SDM). There are n (n<=$N_s$) Transmission Configuration Indication (TCI) states within the single slot, with overlapped time and frequency resource allocation.

In a Scheme 1a, each transmission occasion is a layer or a set of layers of the same TB, with each layer or layer set is associated with one TCI and one set of Demodulation Reference Signal (DMRS) port(s). A single codeword with one redundancy version (RV) is used across all spatial layers or layer sets. From the UE perspective, different coded bits are mapped to different layers or layer sets with the same mapping rule as in Rel-15.

In a Scheme 1b, each transmission occasion is a layer or a set of layers of the same TB, with each layer or layer set is associated with one TCI and one set of DMRS port(s). A single codeword with one RV is used for each spatial layer or layer set. The RVs corresponding to each spatial layer or layer set can be the same or different. Codeword-to-layer mapping when total number of layers is less than or equal to 4 is for further study (FFS).

In a Scheme 1c, one transmission occasion is one layer of the same transport block (TB) with one DMRS port associated with multiple TCI state indices, or one layer of the same TB with multiple DMRS ports associated with multiple TCI state indices one by one. Applying different modulation coding schemes (MCS)/modulation orders for different layers or layer sets can be discussed.

Scheme 2 uses frequency division multiplexing (FDM). There are n (n<=Nf) TCI states within the single slot, with non-overlapped frequency resource allocation. Each non-overlapped frequency resource allocation is associated with one TCI state. The same single/multiple DMRS port(s) are associated with all non-overlapped frequency resource allocations. Applying different MCS/modulation orders for different non-overlapped frequency resource allocations may be discussed. Details of frequency resource allocation mechanism for FDM Schemes 2a/2b with regarding to allocation granularity and/or time domain allocation can be discussed.

In a Scheme 2a, a single codeword with one RV is used across full resource allocation. From UE perspective, the common RB mapping (codeword to layer mapping as in Rel-15) is applied across full resource allocation.

In a Scheme 2b, a single codeword with one RV is used for each non-overlapped frequency resource allocation. The RVs corresponding to each non-overlapped frequency resource allocation may be the same or different.

Scheme 3 uses time division multiplexing (TDM). There are n (n<=$N_{t1}$) TCI states within the single slot, with non-overlapped time resource allocation. Each transmission occasion of the TB has one TCI and one RV with the time granularity of mini-slot. All transmission occasion (s) within the slot use a common MCS with same single or multiple DMRS port(s). RV/TCI state may be the same or different among transmission occasions. Channel estimation interpolation across mini-slots with the same TCI index is FFS.

Scheme 4 uses time division multiplexing (TDM). There are n (n<=$N_{t2}$) TCI states with K (n<=K) different slots. Each transmission occasion of the TB has one TCI and one RV. All transmission occasion (s) across K slots use a common MCS with same single or multiple DMRS port(s). The RV/TCI state may be the same or different among transmission occasions. Channel estimation interpolation across slots with the same TCI index is FFS.

Multiple transmit-receive points (M-TRP)/panel based URLLC schemes may be compared in terms of improved reliability, efficiency, and specification impact. The support of number of layers per TRP may be discussed The following agreements have been made on Scheme 3 and Scheme 4.

For multi-TRP based URLLC, scheduled by single downlink control information (DCI), support scheme 3 and 4 has been agreed. FFS are any restrictions/modifications of supporting scheme 3/4, e.g., considering the number of beam switches within the slot and the delay from scheduling DCI indicating beam switch to scheduled PDSCH. How to address M-TRP/panel based URLLC operation in FR2 can be discussed.

For single-DCI based M-TRP URLLC schemes 3 & 4, there is support for the following design with respect to the maximal number of transmission layers per transmission occasion, down-select one from the following options; option 1: up to single layer transmission or option 2: up to two layers transmission and PDSCH repetition indication mechanism for the number of repetitions, down-select one from following options option 1: Dynamic indication or option 2: High-layer configured as Rel-15.

For single-DCI based M-TRP URLLC schemes 3 & 4, design with respect to resource allocation in time domain is supported with further details of the signaling, e.g. starting from the signaling mechanism of slot aggregation in Rel-15, whether a minimal gap between PDSCH mini-slot/slot groups is needed, whether the same number of symbols should be indicated for each repetition and whether/how to handle the time domain resource allocation considering slot boundary or DL/UL switch in a slot FFS. For the resource allocation at the frequency domain same frequency domain resource allocation across repetitions as Rel-15.

For the number of TCI states across PDSCH repetitions, one of following options may be selected. In option 1, there are up to 2 TCI states, one TCI codepoint can indicate up to 2 TCI states as already agreed in Rel-16 for eMBB. In option 2 there are up to 4 TCI states. One TCI codepoint may indicate up to 4 TCI states. Alternatively, a new field in DCI (or reuse one or more existing fields in DCI) may be used for indication. For example, TCI states and RV sequences may be jointly preconfigured and the combination of TCI states/RV sequences is jointly indicated in DCI. One codepoint in joint field is to indicate up to 4 TCI states and corresponding RV sequences.

For RV sequences for PDSCH repetitions, Option 1 is to support Rel-15 RV sequences at least. FFS is whether additional RV sequence(s), e.g {0,0,0,0}, {0,3,0,3}, {0,3,2,1}, are needed, and whether/how a RV sequence applied to the UE is per TRP. In Option 2, RV sequences are preconfigured by higher layer without restriction of specific orders in spec.

How to map RVs in RV sequences and indicated TCI states to transmission occasions taking into account whether the number of transmission occasions is dynamically indicated or higher layer configured, whether the selected RV sequence depends on the number of TCI state(s) indicated in the codepoint, whether channel estimation interpolation across mini-slots/slot with the same TCI index LDPC (low density parity check code) base graph and transport block size (TBS) shall be the same across each repetition.

In general, scheme 3 has many items that still need further agreements. In the following, we focus on the repetition pattern of Scheme 3 and propose enhancements/consideration for Scheme 3 (TDM) of multi-TRP based URLLC transmission.

Figure 4:
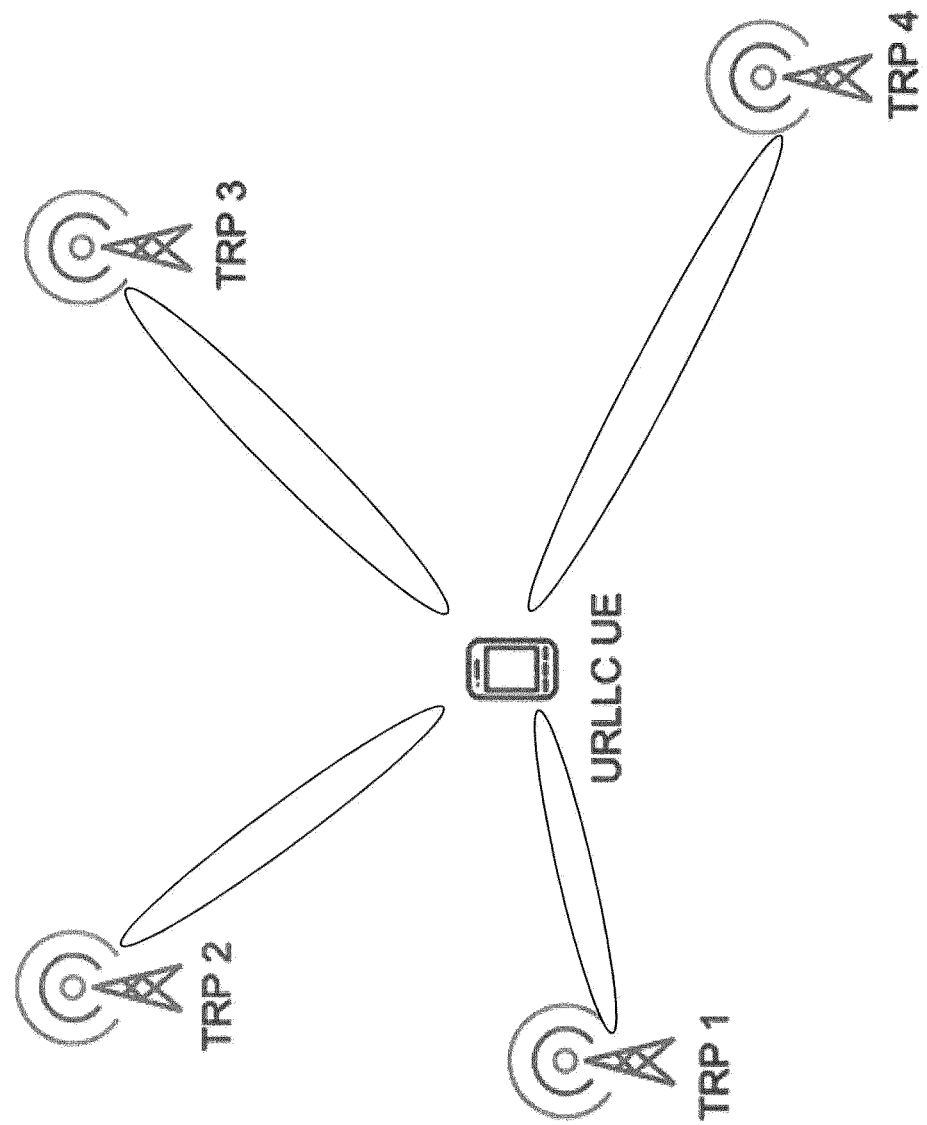
FIG. 4 shows a schematic diagram of multi TRP based URLLC.

FIG. 4 shows a schematic diagram of example scenario using Scheme 3, with four TRPs supporting one URLLC UE. In this scenario, there are repetitions of the same transport block (TB) via multiple TRPs in a slot.

Integrated access backhaul (IAB) nodes may be used as multiple TRPs and coordination among TRPs are considered to support multi-point transmissions. In particular, IAB related enhancement in Rel-16 to support DL timing alignment between nodes are as follows.

An IAB node should set its downlink (DL) transmission (TX) timing ahead of its DL reception (Rx) timing by TA/2+T_delta. T_delta is signalled from the parent node, where the value is intended to account for factors such the offset between parent DL Tx and uplink (UL) Rx, if any due to factors such as Tx to Rx switching time, HW impairments, etc.

The value range and granularity of Tdelta, the need for aperiodic/periodic updates of Tdelta, other timing impairment factors for adjusting IAB node timing to be included in Tdelta and timing alignment when the IAB node has multiple parents are FFS.

In most practical cases, TRPs may have time synchronous transmissions, where DL timing of the TRPs are aligned with reasonable accuracy. DL timing alignment between TRPs or integrated access and backhaul (IAB) nodes are considered essential to maintaining coordinated interference and transmission via different nodes.

Timing advance (TA) is the timing gap between UL Tx timing and DL Rx timing, which is derived based on existing Rel-15 mechanism.

When Scheme 3 of the multi-TRP based URLLC is applied within the synchronous network, the DL reception at the UE which is supported by multi-TRP transmissions may be different. This can be common when the multi-TRP transmissions have different propagation delays to the UE. Having different reception times at the UE may be fine in regular multi-TRP operation, e.g. non-coherent joint transmission (NCJT), where both transmissions are taken place at the same time. In such occasions, one transmission anyways considered to be an interference to the other transmission. However, in URLLC enhancements with multi-TRP, scheme 3 should have time orthogonality between transmissions where the reliability of the TB repetition is improved by transmitting via different TRPs.

Figure 5:
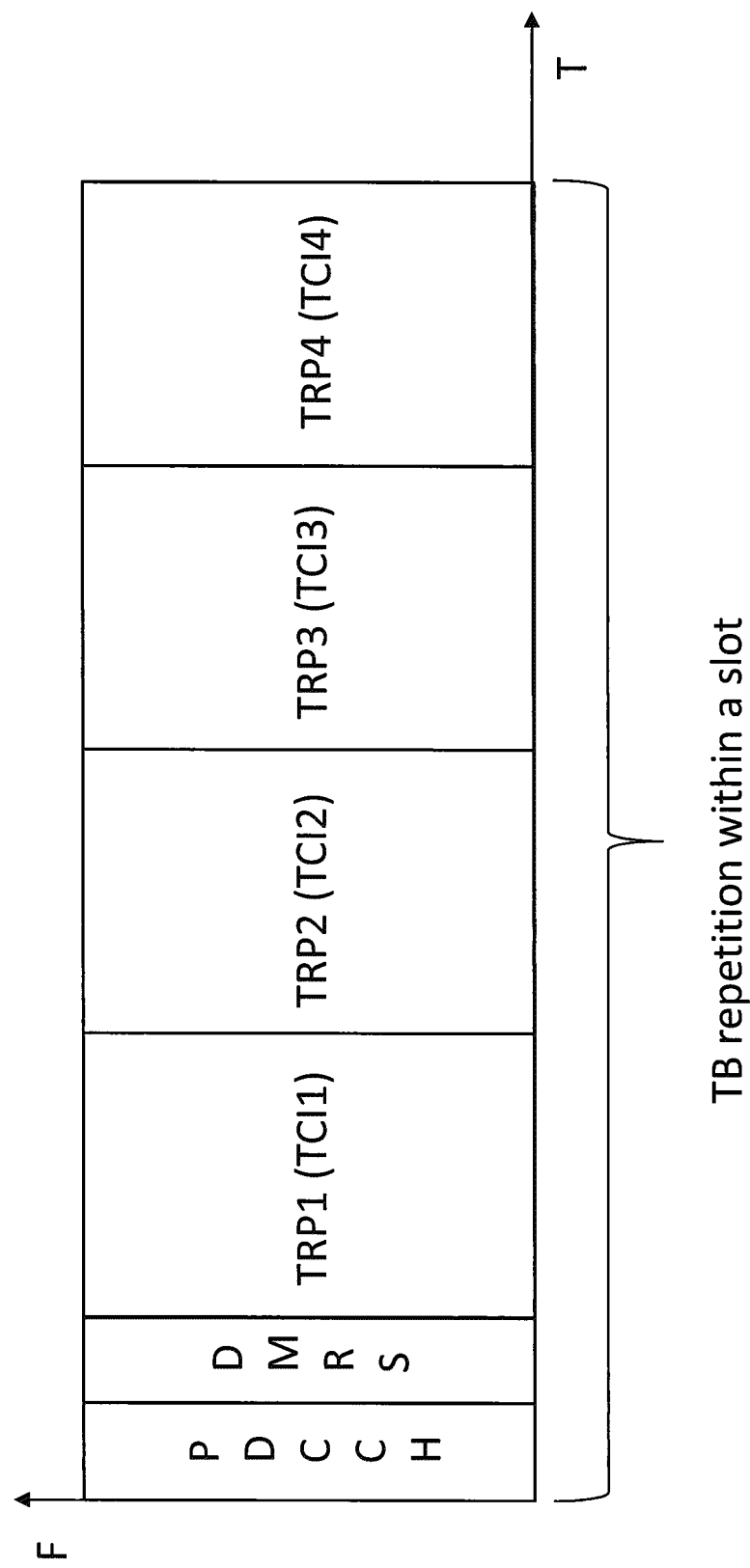
FIG. 5 shows a block diagram of an example Scheme 3 transmission.

FIG. 5 shows a block diagram of an example in which four TRPs are involved in Scheme 3 and adjacent symbols are assigned to each TRP. A single PDCCH is supposed to schedule all transmissions and predefined pattern of TCIs (where each may represent different TRP) shall follow the transmissions. However, there may be a problem if different propagation delays are experienced at the UE from each TRP. As DL timings are aligned within TRPs that are coordinating, different propagation delays may cause different reception timing at the UE. If the transmissions are not scheduled correctly at the TRPs, then there may be overlapping reception at the UEs, and primary motivation of the TDM of retransmissions may not be achieved.

Figure 6:
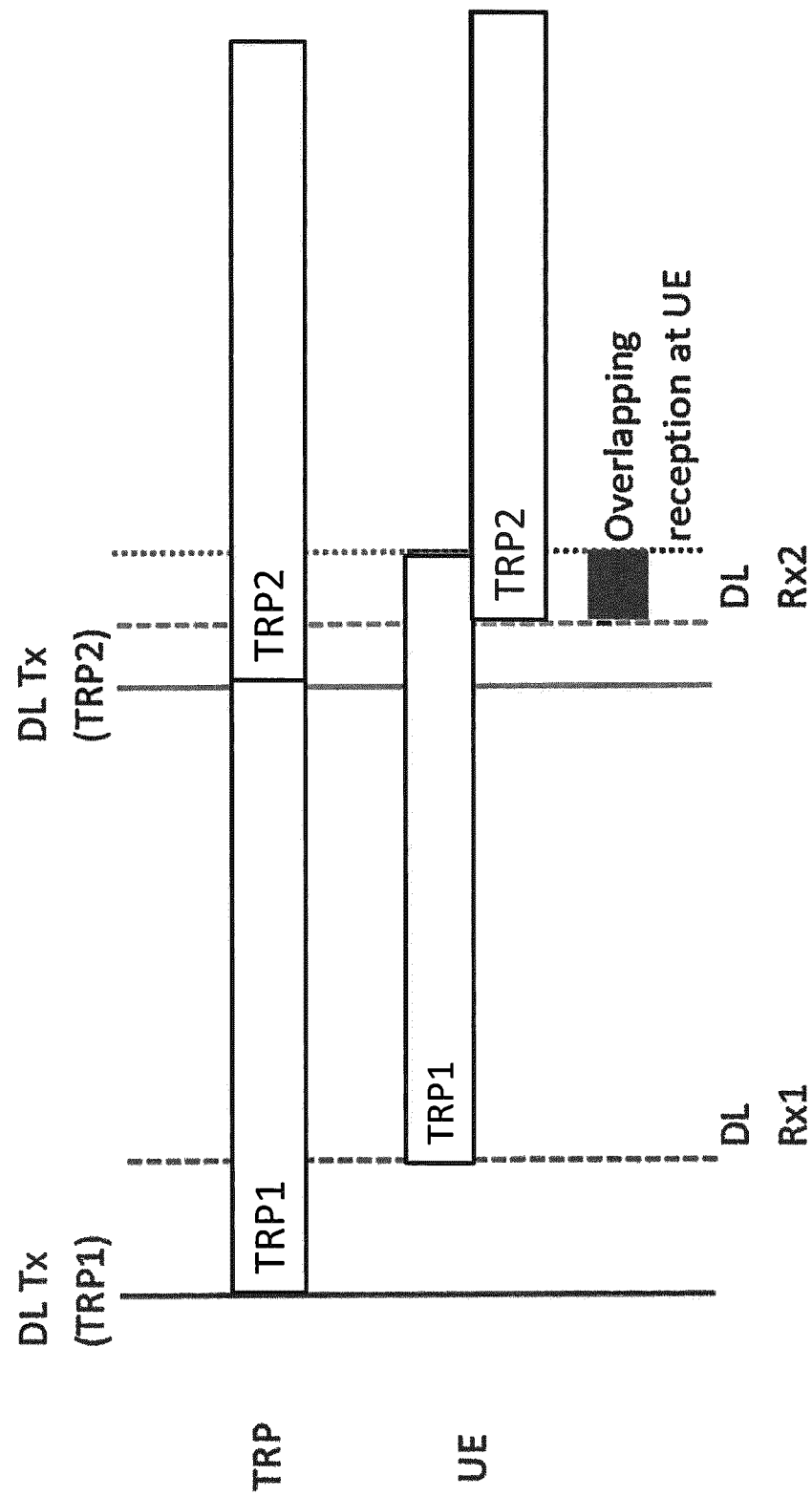
FIG. 6 shows a schematic timing diagram of a transmission for a TRP1 and TRP2.

An example of such a situation is illustrated in FIG. 6 where we consider two TRPs. The first TRP propagation delay is much larger that of the second TRP and UE experiences overlapping receptions in the last few symbols of the TRP1 transmission.

Another consideration with the TDM scheme 3 is how to utilize the time resources efficiently when defining a repetition pattern considering multiple TRPs. Without proper handling of multi-TRP transmission repetition pattern, it may be required to have a worst case scenario gap between TRP transmissions, and therefore a mechanism to reduce the overhead may be required.

The ranking of PUCCH transmissions in UL due to different timing advances has been considered to avoid overlapping in the UE transmissions. This may be used to handle TDM PUCCH transmissions and ranking of the PUCCH resources is done based on the knowledge of the TA at the TRPs.

Figure 7:
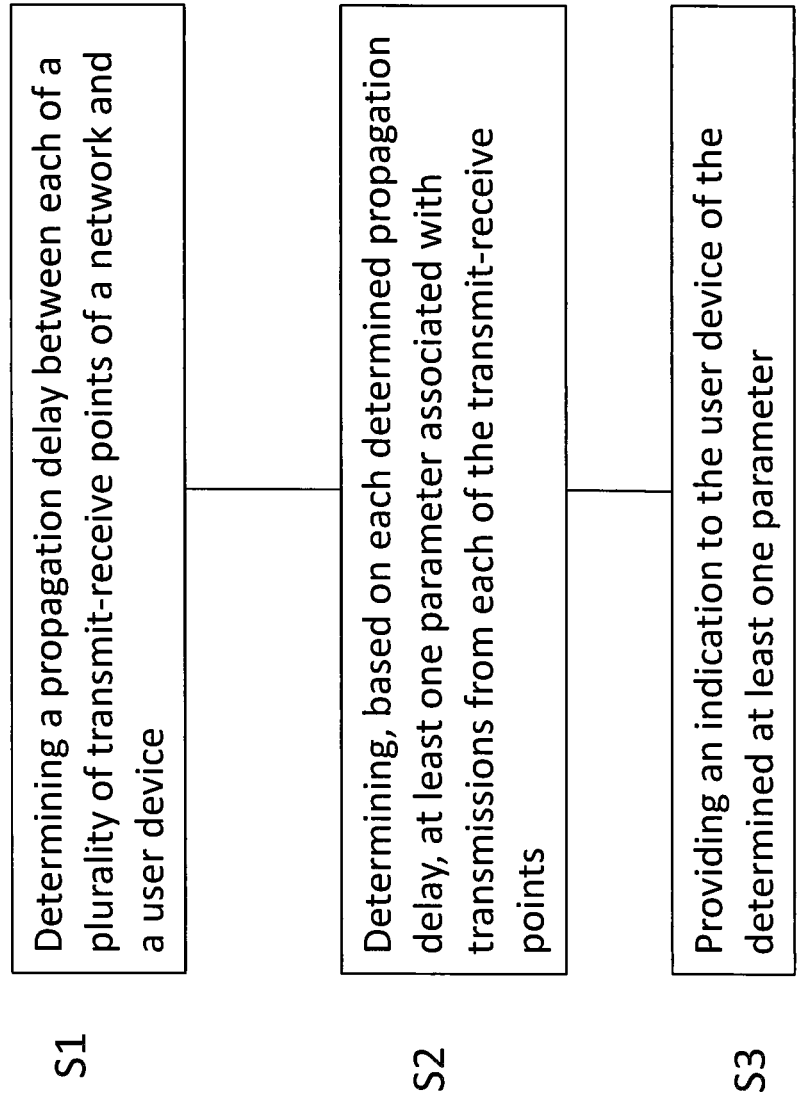
FIG. 7 shows a flowchart of a method according to an example embodiment.

FIG. 7 shows a flowchart of a method according to an example embodiment.

In a first step, S1, the method comprises determining a propagation delay between each of a plurality of transmit-receive points of a network and a user device.

In a second step, S2, the method comprises determining, based on each determined propagation delay, at least one parameter associated with transmissions from each of the transmit-receive points.

In a third step, S3, the method comprises providing an indication to the user device of the determined at least one parameter.

The transmit-receive point may be an IAB node.

The propagation delay may be determined based on timing advance information. The method may comprise tracking the initial timing advance information and subsequent timing advance updates of each TRP and the UE.

The TA value or the parameters associated with timing (such as $N_{TA}$ and $N_{TA\_offset}$ or T_delta for IAB cases) may be used to estimate the propagation delay (Tp) between TRP and the UE. For example, a TRP may use the knowledge of $TA=(N_{TA}+N_{TA\_offset}) \times T_c$ as defined in [38.133] and estimate the propagation delay (Tp) between itself and the UE.

A TRP may receive an indication of an initial TA from the user device and any other subsequent adjustments applied via TA control loop to determine the TA value used by the UE.

The propagation delay may be determined at each of the plurality of TRPs. A TRP may coordinate the knowledge of the Tp at least with one other TRPs or with a central unit.

That is, one of the TRPs (a primary TRP) may receive an indication of the propagation delay from at least one of the plurality of TRPs or the TRPs may provide an indication of its propagation delay to a central unit.

The primary TRP or central unit may determine, based on each determined propagation delay, at least one parameter associated with transmissions from each of the transmit-receive points. That is, at the primary TRP or central unit, propagation delay from each TRP to the UE may be used to decide the parameters.

The at least one parameter associated with transmissions from each of the transmit-receive points may comprise at least one of a repetition pattern i.e., the order of the TRP transmissions (TCI pattern) or a timing gap between TRP transmissions. The TRPs may be supporting transmissions of the same transport block in different time resources within a slot duration (i.e. TDM transmission).

If an order of the TRP transmissions is determined based on the Tp of each link, the indication to the user device of the at least one determined parameter may comprise the transmission order or TCI pattern. In one example, a single TCI pattern (or transmission pattern) may be configured via higher layer signaling. In another example, multiple TCI patterns (or transmission patterns) may be configured via higher layer signaling and one pattern may be selected with dynamic signaling.

If a timing separation between repetitions of the same transport block is determined based on the Tp of each link (i.e. if the determined parameter is a timing gap), the indication to the user device of the at least one determined parameter may comprise a timing gap between adjacent repetitions. The timing gap may be indicated jointly or separately from the start symbol S and the allocation length L (Rel-15 parameters).

If the UE is scheduled with time domain overlapping reception, the UE shall either not be expected to decode the transmissions or decode only the non-overlapping portions of the repetitions (soft combining only LLR that corresponding to the non-overlapping symbols).

The UE may provide an indication that transmissions from at least two of the plurality of transmit-receive points are overlapping when received at the user device. The at least one parameter may be determined in response. For example, the UE may indicate the overlapping of the transmissions, such that TRPs can reconfigure the transmission pattern, TCI pattern or timing gap between the TRP transmissions.

The TRP may have DL timing synchronisation. The DL timing synchronisation may be derived based on GNSS or over the air (OTA) or any other suitable technique.

Alternatively, the DL timing synchronization may not be assumed across TRPs. In this case, the procedure for determining the at least one parameter and providing an indication to the at least one parameter, i.e., for tracking the TA and exchanging the Tp related information, may be similar to the previous scenario.

In addition, TRPs may require coordinating DL timing related information or enable DL timing estimation of TRPs. That is, when at least one of the plurality of transmit-receive points are asynchronous, the method may comprise determining downlink timing related information for the at least one of the plurality of transmit-receive points and determining transmission order for transmissions or a timing gap between transmissions based on the propagation delay and the downlink timing related information.

The downlink timing related information may be a downlink timing offset relative to a common timing reference at each of the plurality of transmit-receive points In some example embodiments, exact DL timing offset information with reference to a common timing source may be available at TRPs and this timing information is exchanged.

Figure 9:
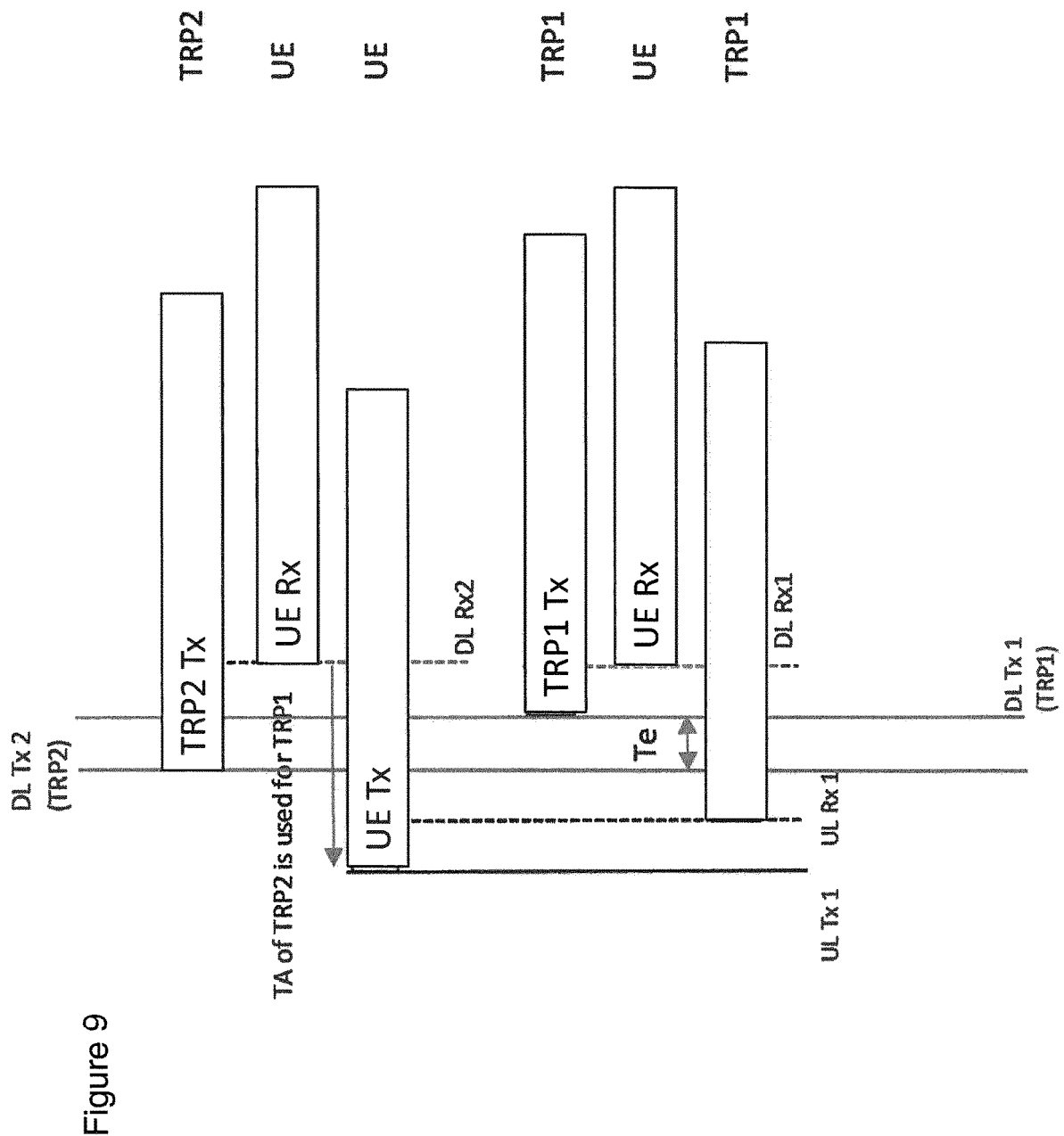
FIG. 9 shows a schematic timing diagram of a transmission for a non-synchronised TRP1 and TRP2 according to an example embodiment.

The downlink timing information is determined based an indication from the user device. In certain example embodiments, DL timing related information may be derived based on UE assisted techniques. Since the UE is capable of communicating between multiple TRPs, the UE may indicate the difference between DL timing receptions (considering two TRPs), which may be used to derive the repetition pattern or timing gap between transmissions. That is, the indication from the user device may be an indication of a difference between downlink timing reception from two of the plurality of transmit-receive points In another example scheme, illustrated in FIG. 9, UE may help TRPs to derive exact DL timing difference. In this example, the indication from the user device may be an uplink timing of a reference transmission from the user device at one of the plurality of transmit-receive points In this example a first TRP (TRP1) and a second TRP (TRP2) have independent TA loops and determine Tp values. (DL Tx2−DL Rx2) and (DL Tx1−DL Rx1) are respective Tp values.

The UE uses TA intended for TRP2 with reference to its DL reception timing from TRP2 for an UL transmission to TRP1. UL transmission timing is UL Tx 1. TRP1 receive the UL transmission by UE at UL Rx 1.

After the exchange of respective Tp values and using received UL Rx timing of the reference transmission by the UE, the TRP1 can derive the difference (Te) between DL timing of TRPs. This allows UE assisted DL timing derivation for the TRPs.

With multiple TRP coordination of the timing difference between DL TRP transmissions, it may be possible to get the maximum timing offset between DL transmissions. This timing offset together with the propagation delay from TRPs to the UE may be used to decide the repetition pattern or to decide the timing separation between TRP transmissions.

Figure 8:
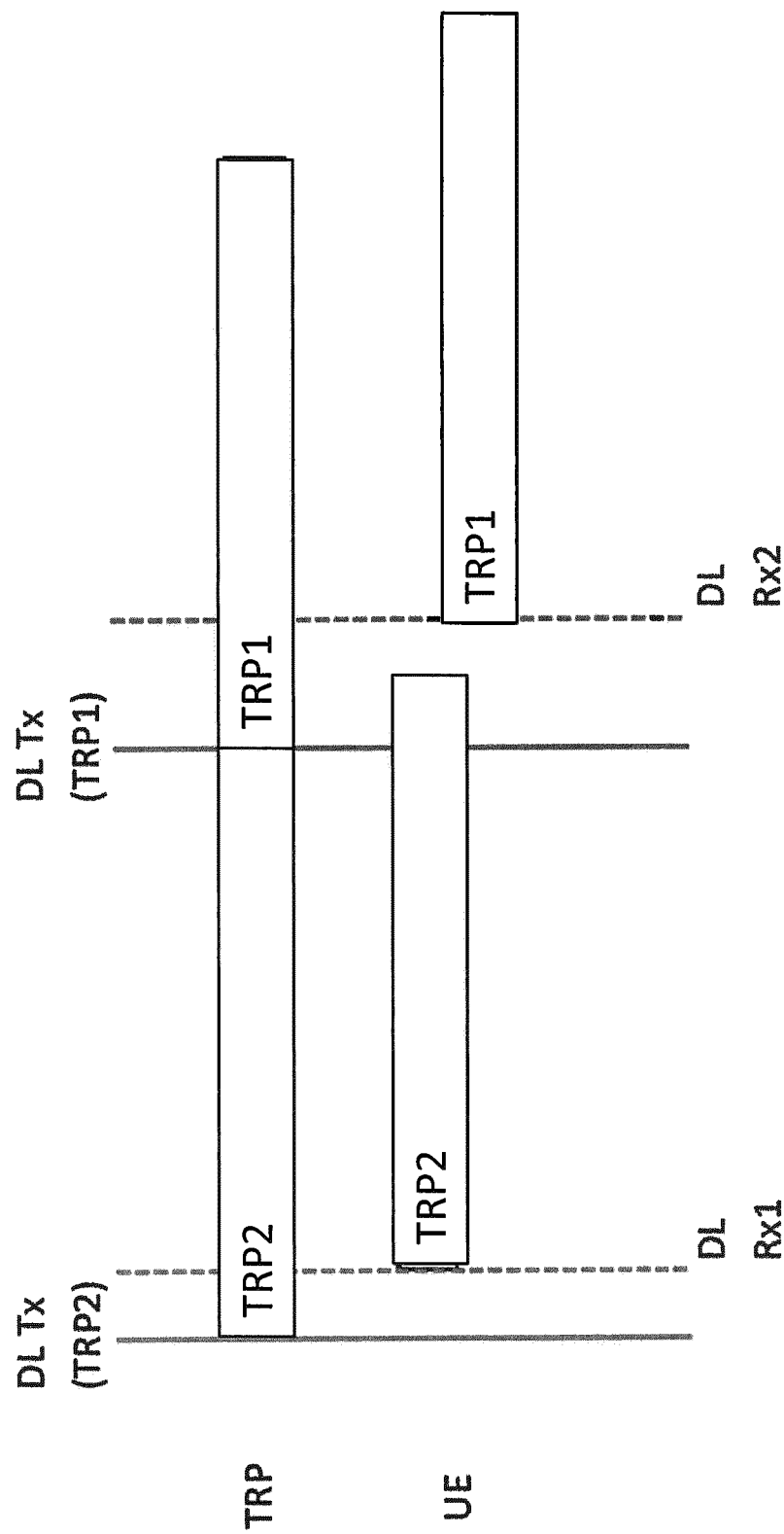
FIG. 8 shows a schematic timing diagram of a transmission for a TRP1 and TRP2 according to an example embodiment.
Figure 10:
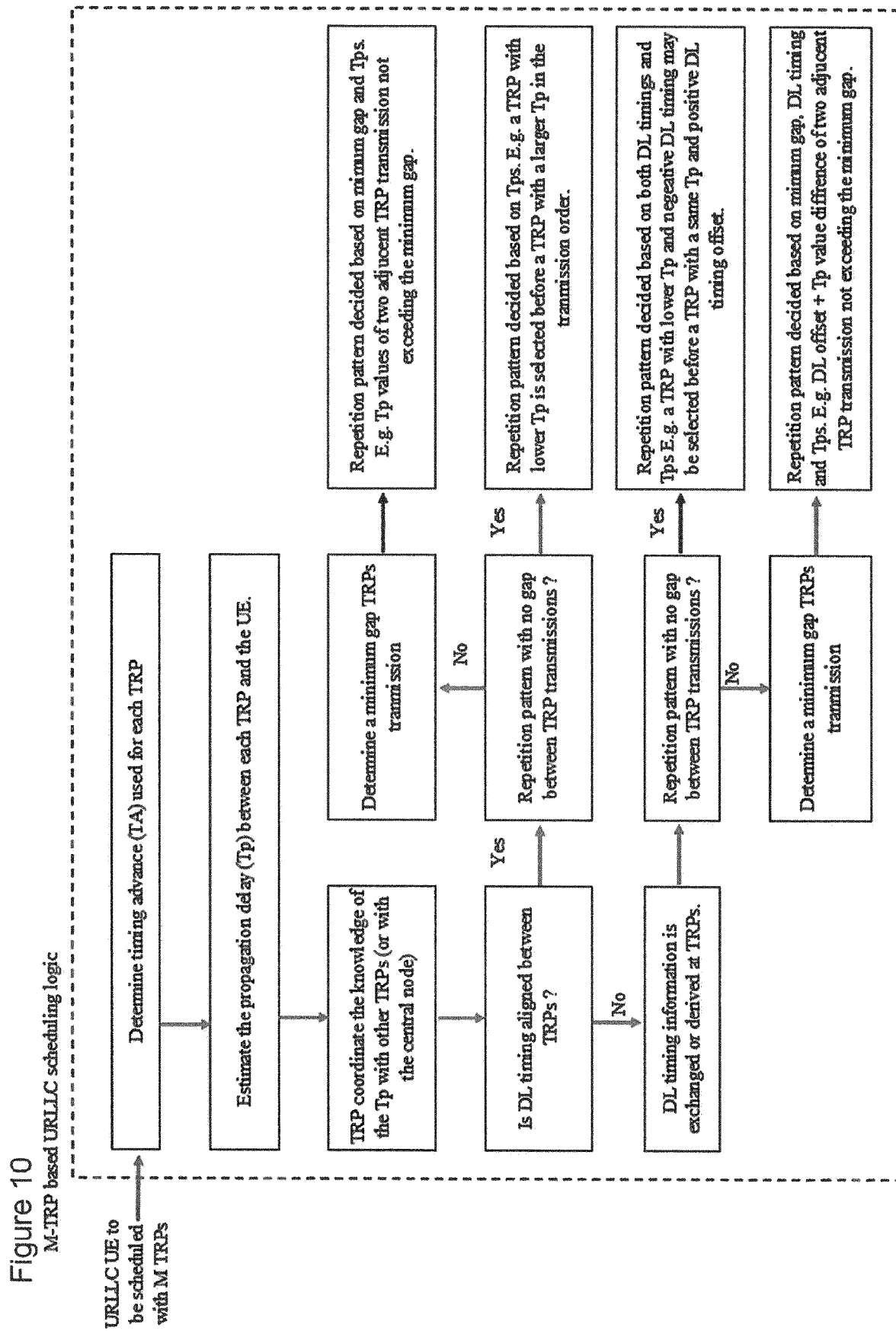
FIG. 10 shows a flowchart of a method according to an example embodiment.

FIG. 10 shows a flowchart of a logic which may be used to implement a method as described above with respect to FIGS. 7 to 9. The logic depicted in FIG. 10 may be carried out by a central unit (CU) where information related to each TRP is gathered or by a primary TRP where information related to Tp and DL timings are exchanged.

As shown in FIG. 10, the first step is to identify the TRPs that coordinate to improve the reliability of the transmission and next to determine TA related information to derive propagation time at each TRP.

After that step, exchanging the information on Tp is exchanged. The TRP coordinates the knowledge of the Tp with other TRPs (or with the central node).

Next, it is determined whether DL timing is aligned between TRPs. If so, the repetition pattern and/or timing gap is determined based on the propagation delay. If there is a repetition with no gap between the TRP transmissions, the repetition pattern may be decided based on propagation delay. For example, a TRP with a lower Tp is selected before a TRP with a larger Tp in the transmission order.

If there is a gap between TRP transmissions, a minimum gap between TRPs transmissions is determined and the repetition pattern may be determined based on the minimum gap and propagation delay. For example, the propagation delay of two adjacent TRP transmission should not exceed the minimum gap.

The steps where repetition pattern and/or minimum timing gap is determining separately for the cases of synchronized nodes and unsynchronized nodes is shown in FIG. 10. If at least one node is not in sync in the DL timing, it is treated under the second approach.

That is, the DL timing is not aligned between TRPs, the repetition pattern and/or timing gap may be decided based on both DL timing information and Tps.

If there is a repetition with no gap between the TRP transmissions, the repetition pattern may be decided based on propagation delay and DL timing information. For example, a TRP with a lower Tp and negative DL timing is selected before a TRP with the same Tp and positive DL timing offset in the transmission order.

If there is a gap between TRP transmissions, a minimum gap between TRPs transmissions is determined and the repetition pattern may be determined based on the minimum gap, DL timing and propagation delay. For example, the propagation delay and DL offset of two adjacent TRP transmission should not exceed the minimum gap.

The method described above may support Scheme 3 with multiple TRPs where adjacent symbols are scheduled for time domain repetitions. It is possible that the method may be taken into account in RAN4 requirements when supporting the time domain repetition across different TRPs. Also, some impact on signalling between TRPs may also be needed to exchange the Tp and transmission order related details.

The method may prevent any collisions at the UE on reception from multiple TRPs.

The method may be implemented in a user equipment as described with reference to FIG. 2 or a control apparatus as described with reference to FIG. 3.

An apparatus may comprise means for determining a propagation delay between each of a plurality of transmit-receive points of a network and a user device, determining, based on each determined propagation delay, at least one parameter associated with transmissions from each of the transmit-receive points and providing an indication to the user device of the determined at least one parameter.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to NR MIMO enhancements for Rel-16, similar principles can be applied in relation to other networks and communication systems where multiple transmit-receive points are used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus, comprising:
   at least one processor; and
   at least one memory including computer program code,
   the at least one memory and the computer program code configured, with the at least one processor, to cause the apparatus at least to
   determine a propagation delay between each of a plurality of transmit-receive points of a network and a user device based on timing advance information;
   determine downlink timing related information for at least one of the plurality of transmit-receive points, in response to that at least one of the plurality of transmit-receive points is asynchronous;
   determine, based on each determined propagation delay, at least one parameter associated with transmissions from each of the transmit-receive points,
   wherein the at least one parameter is a transmission order for transmissions from the plurality of transmit-receive points repetition or a timing gap between transmissions from the plurality of transmit-receive points, and the transmission order or the timing gap is determined based also on the determined downlink timing related information; and
   provide an indication to the user device of the determined at least one parameter.

2. The apparatus according to claim 1, wherein the downlink timing related information is a downlink timing offset relative to a common timing reference at each of the plurality of transmit-receive points.

3. The apparatus according to claim 1, wherein the downlink timing related information is determined based an indication from the user device.

4. The apparatus according to claim 3, wherein the indication from the user device comprises one of an indication of a difference between downlink timing reception from two of the plurality of transmit-receive points and the uplink timing of a reference transmission from the user device at one of the plurality of transmit-receive points.

5. The apparatus according to claim 1, wherein determining downlink timing related information for at least one of the plurality of transmit-receive points comprises receiving an indication at a central unit or a primary transmit-receive point from the at least one of the transmit-receive points of the downlink timing related information.

6. The apparatus according to claim 1, wherein the at least one memory and the computer program code further configured, with the at least one processor, to cause the apparatus at least to:
   receive an indication that transmissions from at least two of the plurality of transmit-receive points are overlapping when received at the user device,
   wherein in response, determining the at least one parameter comprises determining the at least one parameter associated with the transmissions from the transmit-receive points.

7. The apparatus according to claim 1, wherein the transmit-receive points comprise an integrated access and backhaul node.

8. The apparatus according to claim 1, wherein determining a propagation delay between each of the plurality of transmit-receive points of a network and the user device comprises receiving an indication at a central unit or a primary transmit-receive point from at least one of the transmit-receive points of the propagation delay between the user device or the at least one transmit-receive point.

9. The apparatus according to claim 1, wherein the transmissions from the plurality of transmit-receive points comprise the same transport block in different time domain resources within a slot duration.

10. A method comprising:
    determining a propagation delay between each of a plurality of transmit-receive points of a network and a user device based on timing advance information;
    determining downlink timing related information for at least one of the plurality of transmit-receive points, in response to that at least one of the plurality of transmit-receive points is asynchronous;
    determining, based on each determined propagation delay, at least one parameter associated with transmissions from each of the transmit-receive points,
    wherein the at least one parameter is a transmission order for transmissions from the plurality of transmit-receive points repetition or a timing gap between transmissions from the plurality of transmit-receive points, and the transmission order or the timing gap is determined based also on the determined downlink timing related information; and
    providing an indication to the user device of the determined at least one parameter.

11. The method according to claim 10, wherein the downlink timing related information is a downlink timing offset relative to a common timing reference at each of the plurality of transmit-receive points.

12. The method according to claim 10, wherein the downlink timing related information is determined based an indication from the user device.

13. The method according to claim 12, wherein the indication from the user device comprises an indication of a difference between downlink timing reception from two of the plurality of transmit-receive points or the uplink timing of a reference transmission from the user device at one of the plurality of transmit-receive points.

14. A non-transitory computer readable medium comprising program instructions for causing an apparatus to perform at least the following:
    determining a propagation delay between each of a plurality of transmit-receive points of a network and a user device based on timing advance information;
    determining downlink timing related information for at least one of the plurality of transmit-receive points, in response to that at least one of the plurality of transmit-receive points is asynchronous;

determining, based on each determined propagation delay, at least one parameter associated with transmissions from each of the transmit-receive points, wherein the at least one parameter is a transmission order for transmissions from the plurality of transmit-receive points repetition or a timing gap between transmissions from the plurality of transmit-receive points, and the transmission order or the timing gap is determined based also on the determined downlink timing related information; and providing an indication to the user device of the determined at least one parameter.

* * * * *